United States Patent Office 3,387,331
Patented June 11, 1968

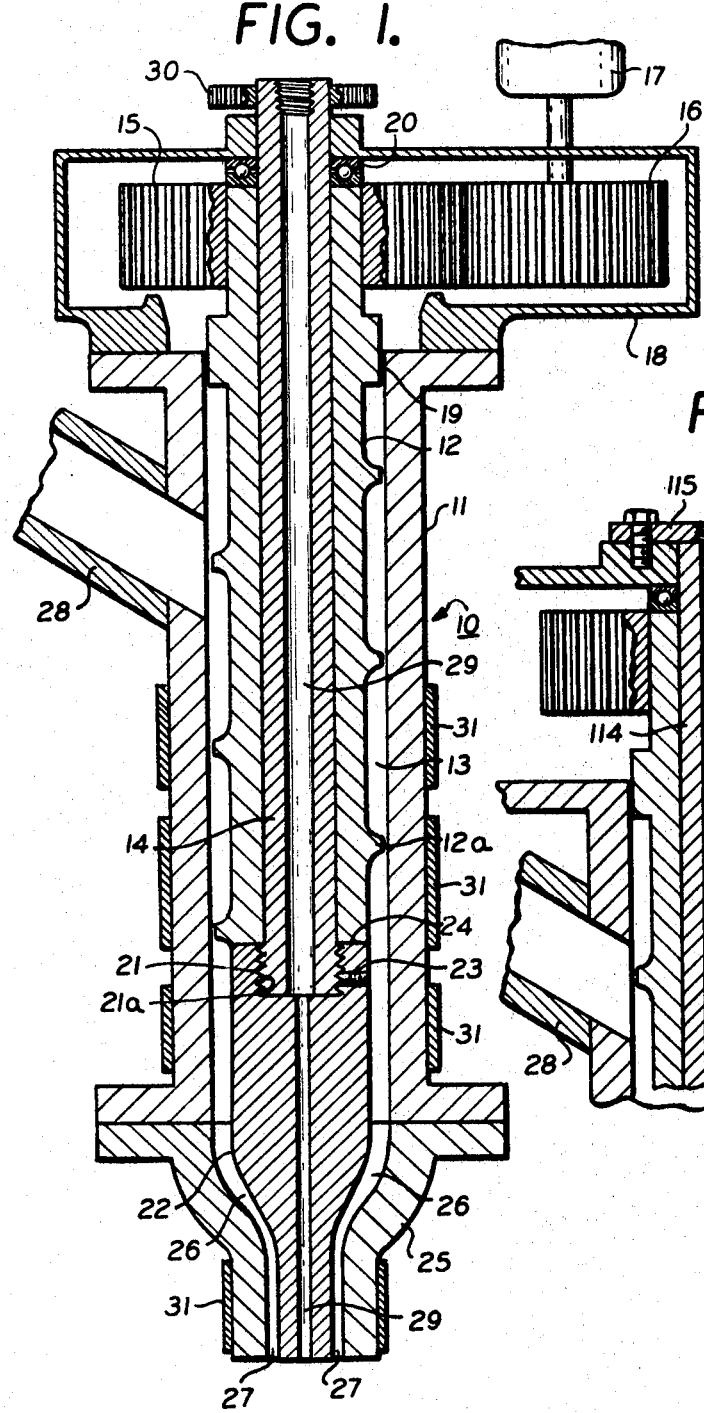
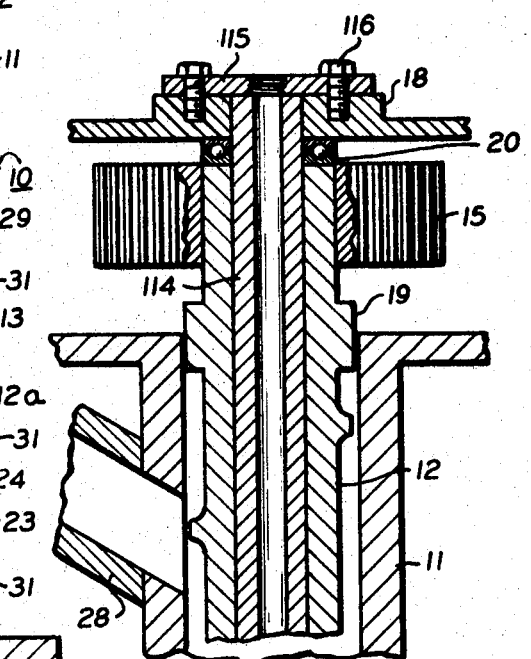

3,387,331
APPARATUS FOR EXTRUDING SEAMLESS
PLASTIC TUBING
Miro Billings, Mahwah, N.J., assignor to Rexall Drug and Chemical Company, Los Angeles, Calif., a corporation of Delaware
Filed July 27, 1965, Ser. No. 475,131
2 Claims. (Cl. 18—14)

ABSTRACT OF THE DISCLOSURE

Apparatus for producing seamless plastic tubing has:
(1) stationary housing,
(2) hollow shaft,
(3) extruding means journaled on shaft defining annular passageway,
(4) hollow die core atached to one of shaft's ends in coaxial relation to extruding means and contiguous to discharge end,
(5) die member attached to housing, encompassing die core to define die orifice, and
(6) source for passing pressurized fluid through hollow shaft and die core.

The shaft rotates at differential rate of speed to rate of rotation of extruding means so a predetermined relative rotation is effected between die core and extruding means.

---

This invention relates to a novel apparatus for extruding thermoplastic materials, and more specifically, relates to an improved apparatus for extruding seamless thermoplastic tubing.

The use of extruding apparatus for thermoplastic materials, such as for forming hollow tubes, is widely known, wherein a screw type extruder forces the thermoplastic material through an annular die orifice to thereby form the tube. A major problem which arises in connection with this particular type of apparatus is that the plastic material upon leaving the screw type extruder, must split its flow path and alter its direction of flow in the process of forming the hollow tube which subsequently is extruded through the annular die orifice. The reason for this is that the extruder sits horizontally and forwards plastic melt in the same plane. In apparatus of this type, the die of the blow molding head contains a pin which is oriented vertically to permit flow of molten plastic in a vertical plane. Thus, in forming the plastic tube, the extruder melt must move horizontally to the die pin, then split and reweld as it passes around the pin and changes its direction of flow to move vertically up or down toward the die orifice. Because the plastic melt moves in a straight line along the die pin on its way to the orifice, the welding of the melt after forming on the side of the pin away from the extruder usually constitutes a weakness in the plastic blown article. The weld line strength is improved by resorting to higher temperatures or pressures both of which are frequently detrimental to heat or pressure sensitive plastics.

In the construction of dies for molten plastic tube formation, the effort to maximize weld strength frequently results in internal configurations that permit some degree of "plastic hang up" or "dead spots" where the melt becomes degraded due to excessive heat history. Polymer degradation in the flow path of a tube forming device is an additional point of potential tube weakness in addition to being a cause of relatively frequent shut downs for die cleaning.

It has been found that the provision of an extrusion forming pin or die core placed concentrically with and contiguously downstream of the extruder screw and in either stationary or counter-rotative relation thereto, will substantially straighten out the flow of material. This essentially will then cause the stream of plastic material to flow generally normal to the plane of the die orifice. There will be no detrimental weld in the formation of the plastic tube since the molten plastic is not required to form around a die pin.

In particular, the novel apparatus of this invention is important in the manufacture of blown thermoplastic bottles formed of hollow plastic tube, wherein the avoidance of seams or welds provides a product of superior quality able to withstand greater stresses in use. The present method of tube extrusion can be used with any known thermoplastic material and is particularly advantageous when applied to vinyls or other less heat stable polymers.

It has been found that best results have been achieved with a vertical flow extruding apparatus. The advantages in a vertical flow apparatus lie in that it requires minimum floor area in a manufacturing plant; the plastic material being extruded can be fed to the machine gravimetrically and further the extruding process is linear with no sharp corners or areas for the thermoplastic material which may cause congestion or detrimental "plastic hang-up."

Accordingly, it is a primary object of this invention to provide an improved and novel extruding apparatus producing seamless thermoplastic tubing.

It is a further object of this invention to provide an extruding apparatus which will produce thermoplastic tubing without undue distortions and degradation of the thermoplastic materials.

Still another object is to provide an improved vertical flow screw-type extruder of simple and compact construction for the extrusion of seamless thermoplastic tubing.

A more particular object of this invention is to provide a novel apparatus for extruding seamless thermoplastic tubing from a vertical flow screw-type extruder without distortion or detrimental building up of the material being extruded.

The manner in which these and other objects and advantages of this invention will be obtained will become apparent from the following detailed description and drawings, in which:

FIGURE 1 is a front elevation view of one embodiment of the apparatus according to this invention; and FIGURE 2 is a partial front elevation of another embodiment of the apparatus according to this invention.

As shown in FIGURE 1 of the drawings, one embodiment of the extruding apparatus 10 includes a housing 11. A screw-type extruding member or screw 12 is positioned within the housing 10, with the screw flights 12a adapted to extrude the thermoplastic material downwardly through annular passageway 13 between the screw 12 and housing 11. The screw 12 is of generally hollow construction permitting a shaft member 14 to extend therethrough. Sufficient clearance is provided between the outer diameter of the shaft member 14 and the inner wall of the screw 12 to allow the latter to be rotatably journaled on the shaft member.

The extruding screw 12 has fastened thereto at its upper end a gear 15 which meshes with a co-acting gear 16 and is driven thereby. Motive power may be furnished to gears 15 and 16 by means of a drive unit 17 which can consist of an electric motor, hydraulic drive or the like; not forming a part of this invention. The gears and the upper end of extruding screw 12 and shaft member 14 are enclosed in a gear box 18.

An axial thrust bearing 20 is positioned between the upper end of the extruding screw 12 and gear box 18 in order to absorb the upward thrust of the screw during the extruding process.

The lower end of shaft 14 projects below the extruding screw 12, and may have external threads 21 thereon. A tube forming pin or die core 22 is adapted to be attached to the bottom end of the shaft member 14 by means of internal threads 21a which engage threads 21. Locking means, as for example, a set screw 23, may be provided to prevent loosening of the die core 22 on the shaft member 14 during the extrusion process.

Upon fastening the die core 22 on the shaft member 14, the former is drawn tightly against the bottom surface of extruding screw 12, thereby forcing the extruding screw against axial thrust bearing 20. The contacting mating surfaces of the die core 22 and extruding screw 12 should be machined so as to form a metal-to-metal seal 24 which will prevent the leakage of the plastic extrudate therebetween.

A bushing or die member 25 is attached to the lower portion of housing 11 and encompasses die core 22 to thereby form passageway 26 which is in communication or co-extensive with passageway 13. Passageway 26 at its lower extremity forms an annular die orifice 27 for the extrusion of the thermoplastic tubing. Passageway 13 is in communication with conduit member 28 which supplies thermoplastic material to the extruding screw 12 for delivery to the die orifice 27.

Shaft member 14 and die core 22 may be hollow to provide a passageway 29 extending therethrough, whereby pressurized fluid or air may be supplied by a source (not shown) for blowing up the tube extruded through die orifice 27. A gear 30 or other suitable drive means can be attached to shaft member 14 in order to impart rotation thereto either in the same direction as the extruding screw or in opposite direction and at the same or lower speed and correspondingly to die core 22.

In order to assure the apparatus is retained at proper temperatures for the extrusion process, a plurality of heating elements or bands 31 may be provided at convenient positions along the housing and die member 25.

FIGURE 2 of the drawings, showing a second embodiment of the extruding apparatus 10, illustrates most of the elements to be identical to the aforedescribed embodiment, however, the shaft member 114 is shown to be of a permanently stationary nature and is attached to the gear box 18. A flange 115 is welded to the top of shaft member 114 and fastened to the gear box by means of fastening bolts 116.

Variations in the size of the tubing to be extruded can be simply effected by merely replacing the die core 22 and die member 25 with other similar components having different passageway 26 proportions and a corresponding change in the size of die orifice 27.

While particular embodiments of this invention are shown above, it will be understood that the invention is obviously subject to variations and modifications without departing from its broader aspects.

What is claimed is:
1. An apparatus for producing seamless tubing from thermoplastic materials comprising a stationary housing, shaft member vertically disposed within said housing, extruding screw means rotatably journaled on said shaft member and defining an annular passageway with said housing, a die core fixedly attached to the lower end of said shaft member in coaxial relation to said extruding screw means and contiguous to its discharge end, a die member attached to said housing and encompassing said die core to thereby define an annular die orifice, said shaft member and die core being hollow so as to define passageway therethrough, and a source for passing pressurized fluid through said passageway, whereby the tube extruded through said die orifice may have internal fluid pressure applied thereto, said means for rotating said shaft member at a differential rate of speed to the rate of rotation of said extruding screw means, whereby a predetermined relative rotation is effected between said die core and said extruding screw means.

2. An apparatus as defined in claim 1, including at least one heating element being positioned about said housing whereby the thermoplastic material being extruded is maintained at a predetermined temperature.

References Cited

UNITED STATES PATENTS

| | | | |
|---|---|---|---|
| 2,199,425 | 5/1940 | Waring | 264—173 |
| 2,695,422 | 11/1954 | Gray. | |
| 3,244,781 | 4/1966 | Covington et al. | 264—209 X |
| 3,256,377 | 6/1966 | Adams | 264—209 |

ROBERT F. WHITE, *Primary Examiner.*

T. J. CARVIS, *Assistant Examiner.*